Figure 1:
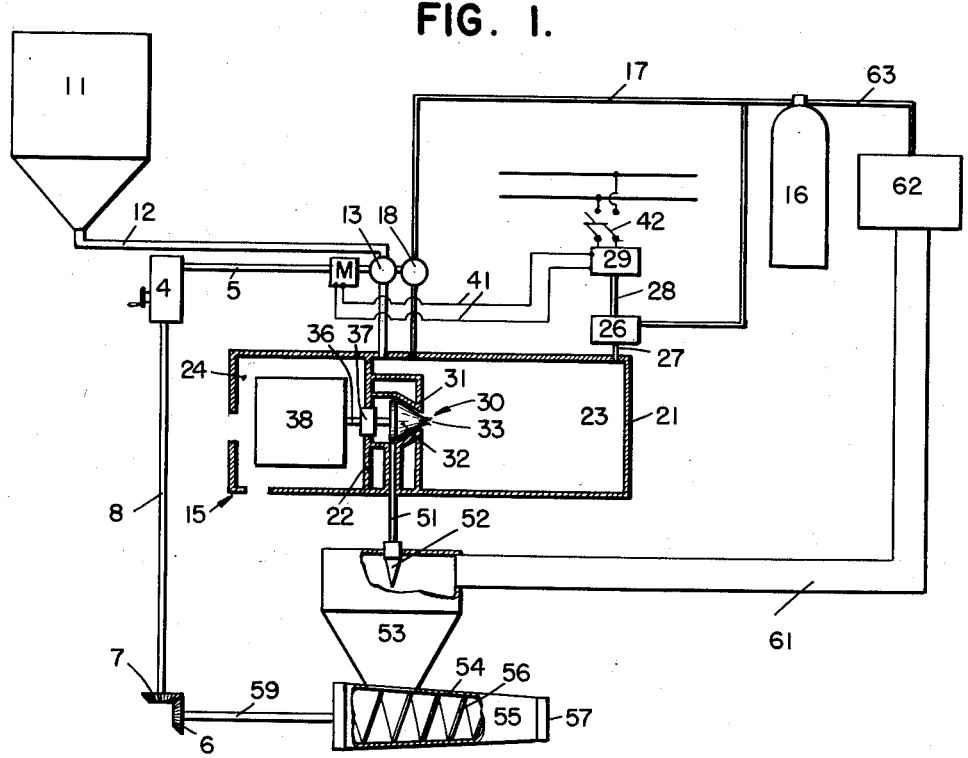

April 29, 1952  E. M. IRWIN  2,594,442
ICE-CREAM MANUFACTURING DEVICE AND PROCESS
Filed June 16, 1947

INVENTOR
EMMETT M. IRWIN
BY
ATTORNEY

Patented Apr. 29, 1952

2,594,442

UNITED STATES PATENT OFFICE 2,594,442

ICE-CREAM MANUFACTURING DEVICE AND PROCESS

Emmett M. Irwin, San Marino, Calif., assignor to Basic Processes, Inc., Pasadena, Calif., a corporation of California Application June 16, 1947, Serial No. 754,888

5 Claims. (Cl. 62—2)

The present invention relates in general to an improved process for changing the phase of a substance from a fluid to a solid with controlled changes in specific gravity. The invention is applicable, for example, in the manufacture of ice cream in which the ingredients move continuously from step to step until finally they emerge as the final product incorporating the desired amount of over-run and frozen to the desired extent. While the process comprising the invention is particularly applicable to the manufacture of ice cream it is to be understood that the principles employed and the relationships by which it is characterized are equally applicable to other fields in which a change from liquid state to a solid state is desired with controlled variation in specific gravity.

Ice cream has for a great many years been one of America's favorite foods and the industry in which it is manufactured has experienced a tremendous growth. Notwithstanding the expansion in consumer demand the process generally used today does not differ materially from that which has been used for decades. Today practically all commercially made ice cream is produced by what may be accurately called the "batch process"; a process characterized by the agitation of individual batches of ice cream mix by paddles in refrigerated containers for the purpose of aeration and freezing. This method differs fundamentally in no material respect from that employed by the individual in making ice cream in his own home with the old type hand crank freezer.

Flavor and smoothness are the factors upon which an ice cream is rated. If the ingredients are properly selected and are of good quality the flavor will be satisfactory. The smoothness, however, is determined by factors which can be controlled in the refrigerating process. The speed of freezing is important, quick freezing being essential to smoothness. Aeration is also important and comprises, specifically, the adsorption of air or any non-toxic gas in the ice cream mix to produce an increase in its bulk, corresponding to a decrease in its specific gravity, and providing what is known in the industry as "over-run." In accordance with current practice employing the batch process aeration and freezing are stopped while the ice cream is quite fluid in order to pour it from the freezer into a suitable storage container in which it is taken to the refrigerating room or box where refrigeration continues until the substance is frozen solid. Accordingly, the time consumed to effect complete refrigeration is usually extended and results in lack of smoothness and frequently large crystals in the product.

The batch process, now used almost universally, is expensive, time-consuming and difficult of accurate control. As the ice cream freezes during the freezing operation the power consumed to drive the stirring paddles increases until finally it is many times that initially required. Also, much human labor is required in the batch process in the preparation of the freezing unit and in the filling and emptying operations. The time required for the latter operations reduces appreciably the time period during which the freezer itself can function productively.

Additionally, in the batch process it is impossible accurately to control the over-run which is dependent upon variables including the speed of paddle movement, the shape of the container, the duration of the mixing operation, and the length of the freezing operation. This lack of accurate control inevitably leads to variations in the product itself. As the laws of many States today require that a given bulk of ice cream shall have a minimum weight it is clear that the control of over-run and the specific gravity of the product is a matter of importance to the manufacturer. To avoid excessive over-run and resulting violation of the law he must, in view of his inability closely to control the variables, provide himself with a large factor of safety which usually means that his product has less over-run than he would desire and would otherwise use. A loss of profit follows directly.

The inherent defects in the batch process led to serious attempts to provide a continuous phase-changing process by which a continuous flow of the ice cream ingredients is changed from its initial liquid state into a frozen solid form. In such a process individual batch freezers were eliminated but in their generally known forms such continuous processes were characterized by the retention of the stirring paddles and freezing was effected by bringing the liquid mix into heat exchange relationship to the refrigerating means. Many of the defects of the old batch method were retained and the new method was not completely satisfactory.

In a second type of continuous process, and it is to this second type that the present invention more closely relates, refrigeration is accomplished by the evaporation of a liquid refrigerant in the presence of the liquid mix. It was found to be difficult, if not impossible, to maintain continuous operation because of spray nozzle freezing and supplementary freezing in the form of contact with refrigerated surfaces was found necessary but results were not satisfactory.

According to the present invention the liquid mix and a liquid refrigerant are thoroughly and completely mixed into a single liquid comprising an emulsion in which they separate only partially at the time the liquid refrigerant evaporates upon the jetting of the single liquid from a spray nozzle into an atmosphere at reduced pressure. The powdered product produced is compressed at a controlled rate to provide a final product of desired density which is delivered continuously. It is imperative that the two liquids be so intimately mixed and brought into such intimate contact in an emulsion that they are unable to follow their natural inclination to separate and in order to effect the desired complete freezing. The intimate mixing, which may be accomplished electrically or mechanically, also effects the adsorption of a part of the refrigerant in the liquid mix to provide over-run upon its subsequent expansion.

With an understanding and appreciation of the defects and shortcomings of the prior art processes and apparatuses for accomplishing change in the phase of substance, particularly in the processing of ice cream, it is an object of the present invention to provide a new and improved phase-changing process and apparatus for the accomplishment thereof.

It is another object of the invention to provide a new and improved process for the manufacture of ice cream in which predetermined quantities of ice cream mix and liquid refrigerant are brought together in an intimate dispersion as a single liquid which is subsequently jetted through a spray nozzle.

Still another object of the invention is to provide a process, and an apparatus for the accomplishment thereof, in which a fluid in a liquid state flows continuously through a series of state-changing steps in which its specific gravity is varied and its temperature lowered to transform it into a solid.

A still further object of the invention is to provide a process, and an apparatus for the accomplishment thereof, in which a liquid is intimately combined with a liquid refrigerant in an emulsion and subsequently jetted through a pressure-reducing nozzle to effect the freezing of the liquid and the liberation of a portion of the contained refrigerant.

A still further object of the invention is to provide a process, and an apparatus for the accomplishing thereof, in which an ice cream mix is combined with a liquid refrigerant normally gaseous at atmospheric temperature and pressure, the mix and the refrigerant being interrelated in an emulsion from which a portion of the refrigerant is released by evaporation to effect the freezing of the mixture, a further portion being retained to effect a decrease in the specific gravity thereof.

Still another object of the invention is to provide a process, and an apparatus for the accomplishment thereof, in which liquid ice cream is intermixed in an emulsion with a liquid refrigerant under pressure and is subsequently jetted through a single pressure-reducing nozzle into a relatively low pressure chamber to effect decrease in the temperature of the liquid and also a decrease in its specific gravity.

A still further object of the invention is to provide an improved automatic apparatus for the continuous production of ice cream.

These and other more specific objects will appear upon reading the following specification and claims and upon considering in connection therewith the attached drawing to which they relate.

Referring now to the drawing in which preferred embodiments of the invention are disclosed diagrammatically:

Figure 1 is a diagrammatic illustration of a first preferred embodiment of the invention in which predetermined quantities of ice cream mix and liquid refrigerant are brought together in an emulsion by means including a colloidal mill from which they are subsequently passed through a pressure-reducing nozzle to effect freezing; and Figure 2 is a diagrammatic disclosure similar to Figure 1 in which the emulsion of the liquid refrigerant in the liquid ice cream mix is effected by high frequency vibration, preferably within the supersonic range.

Referring again to the drawing and to Figure 1 in particular, an apparatus constructed in accordance with the first preferred embodiment of the invention and capable of carrying out the improved process is illustrated. The construction is seen to include a reservoir 11 comprising a source of liquid ice cream or mix, as it is known in the trade. A conduit or pipe 12 connects the bottom of tank 11 through a pump 13, driven by a motor M, to the mixing unit indicated generally by the reference character 15. A source of liquid refrigerant, which may be carbon dioxide or similar non-toxic liquid refrigerant under pressure, is provided in a reservoir 16 connected through a conduit or pipe 17 to mixing unit 15. A pump 18, also driven by motor M, is connected in series with conduit 17 and, in the manner of the pump 13 in the liquid mix line, forces the refrigerant into the mixing unit under pressure. While pumps 13 and 18 are preferably included, their presence is required only to insure that the pressure of the chamber in the mixing unit is sufficiently high as to prevent the liquid refrigerant changing from a liquid to a gas.

Mixing unit 15 comprises a casing 21 divided interiorly by a fixed wall 22 into a sealed mixing chamber 23 to which the conduits 12 and 17 connect, and an unpressurized motor chamber 24. Opening into the mixing chamber 23, and in fact physically positioned therein in the sense that it is upon the same side of the dividing wall 22, is an emulsifier, homogenizer or colloidal mill 30, comprising a stator 31 and a high speed rotor 32. The stator includes a frusto-conical enclosing wall opening at its small end into mixing chamber 23. Rotor 32 is conical, is positioned in stator 31 and, in the manner characteristic of colloidal mills, has its surface spaced from the adjacent stator surface by a very minute distance of the magnitude of .01 inch. The outer end of rotor 32 extends beyond the stator into the mixing chamber 23 where it is slotted to form opposed agitating elements or baffles 33 which function to agitate, circulate and mix the contents of the mixing chamber.

Rotor 32 is carried by a shaft 35 which extends through a sealed bearing 37 in wall 22 and into the unpressurized chamber 24 to connect to a driving motor 38. Both the emulsifier 30 and the mixing chamber 23 contain fluid under pressure and it is desirable that no leakage take place through the seal 37.

Upon being exhausted from the emulsifier 30 the single fluid, now comprising an emulsion of fluid ice cream mix and liquid refrigerant, is conducted through a conduit 51 directly to the spray nozzle 52 opening into the separating chamber or vessel 53. The liquid is jetted through nozzle 52 as a spray at relatively high velocity and upon entering the separating chamber, the pressure in which may be only slightly above atmospheric, a part of the liquid refrigerant evaporates, each particle of refrigerant effecting the freezing of an adjacent mix particle, to effect the complete freezing of all the mix particles moving through the chamber atmosphere and their transformation into flakes or fine powder. The refrigerant adsorbed therein expands upon entering the relatively low pressure separating chamber to effect an increase in bulk of each individual particle and so provides "over-run." The frozen discrete particles under the action of gravity fall through the converging lower portion of the separating chamber into the conical casing 54 of a screw type conveyer or extruder 55. Casing 54 and the cooperative rotary screw 56 positioned therein are so contoured and shaped as to compress the ice cream powder into a solid mass which it forces as a continuous solid cylinder from the outlet port 57. The shaft 59 of the screw 56 extends from the casing 54 and is driven as will be described.

The liquid refrigerant evaporated in chamber 53 to effect freezing of the ice cream is reusable and so is drawn off through a conduit 61 to a recovery unit 62 of a suitable type in which it is recompressed into a liquid and returned to reservoir 16 through a conduit 63.

Because of the variations in pressure of the liquid refrigerant which changes in temperature, and of its characteristic of turning immediately from a liquid to a gas at a pressure below that that which is critical for a particular temperature, controls must be provided to maintain the pressure in the mixing unit above the critical point. This is accomplished by controlling the output of pumps 13 and 18 to maintain a predetermined differential between the pressure in mixing chamber 23 and that in refrigerant container 16. Specifically, in the preferred form a differential pressure regulator 26 is connected in a pressure line 27 between chamber 23 and line 17 at a point adjacent the container 16. The regulator responds to differences in pressure across itself, it being understood that no flow takes place through the line 27, and actuates, through a connection 28, a motor speed controller 29 which in turn controls the speed of motor M to which it is connected by leads 41. The controller is itself supplied with current through a switch 42 from a suitable power source. A decrease in the pressure differential existing between mixing chamber 23 and liquid reservoir 16 causes regulator 26 to actuate controller 29 to effect an increase in the speed of motor M. Pumps 13 and 18 thereupon pump a greater volume of liquid mix and refrigerant, whereupon the desired differential between the two pressures is reestablished. Similarly, should the pressure differential increase beyond the predetermined optimum the motor M is slowed down, less fluid is pumped, and the desired differential is obtained. As both pumps are driven by the same motor their speeds increase and decrease together and the proportion of liquid mix to liquid refrigerant remains constant independent of the rate of flow.

The flow of mix and refrigerant from the mixing chamber 23 through the mill 30 and the nozzle 52 will vary substantially in a direct ratio with the pressure in the mixing chamber.

To handle the output regardless of its rate and in order to insure a predetermined over-run it is desirable to vary the rotational speed of extruder 55 with that rate. The speed of the motor M varies directly with the output rate and one preferred way of varying the extruder's screw speed is to connect its shaft 59 through gears 6 and 7 to a shaft 8 which is itself connected to the drive shaft 5 of motor M through a speed ratio adjuster 4. The latter includes manual adjustment means by which the relative speed of the extruder screw can be changed with respect to the motor speed for the purpose of varying the density of the product, that is, the over-run.

The operation of the phase-changing apparatus constructed in accordance with the present invention is believed to be clear from the foregoing. A liquid to be frozen and expanded, such as a liquid ice cream mix, and a liquid refrigerant are fed into a mixing unit at a pressure sufficiently high to maintain the liquid refrigerant in its liquid state regardless of variations in temperature. In the preferred form disclosed the pressure in the mixing chamber will be maintained a few pounds above the temperature at the refrigerant source. This condition is under the control of the differential pressure regulator 26 which, acting through the motor speed controller 29, varies the speed of motor M and so of pumps 13 and 18 feeding mix and liquid refrigerant, respectively, to the mixing chamber. The two liquids are initially mixed in mixing chamber 23 by the agitating action of the agitating elements 33 at the end of the emulsifier rotor 32. Under the pressure existing within the chamber, and under the drawing action of the high speed emulsifier rotor 32, the single liquid passes between the closely spaced surfaces of the rotor and stator 31. Passage through emulsifier 30 effects an emulsion of the two liquids into a single liquid which is forced through the conduit 51 into the spray nozzle 52 forming the entrance into the separating chamber 53. In the single liquid the components are so intimately mixed that despite their natural aversion to mixing they cannot and do not separate. Any separation is harmful for it results in uneven and incomplete freezing as discrete blobs of first liquid mix and then liquid refrigerant pass through the nozzle.

Upon passing through the spray nozzle 52 into separating chamber 53 part of the liquid refrigerant evaporates and converts the remaining liquid into a dry powder, a part of the refrigerant adsorbed therein expanding to effect a decrease in the specific gravity of the powder by increasing its bulk and providing desirable over-run. The released refrigerant, now a free gas, is drawn to the recovery unit, indicated generally at 62, by which it is returned in liquid form to the reservoir 16.

From the separating vessel or chamber 53 the powdered ice cream falls under the action of gravity into the screw type extruder 55 and is forced from the open end 57 thereof in a solid cylindrical form which may be circular or square or of any desired cross-section. The screw conveyer or extruder must be driven at a speed such that it will handle the product and compact it to the predetermined density. The connection of the extruder screw to the driving motor M of the pumps 13 and 18 assures the output of the extruder will vary directly with the output of those pumps and without variation in the density of the final product. That density can be selectively controlled by adjustment of the speed ratio adjuster 4 and upon being set for one rate of output will maintain the same density even though the rate be varied.

Figure 2:
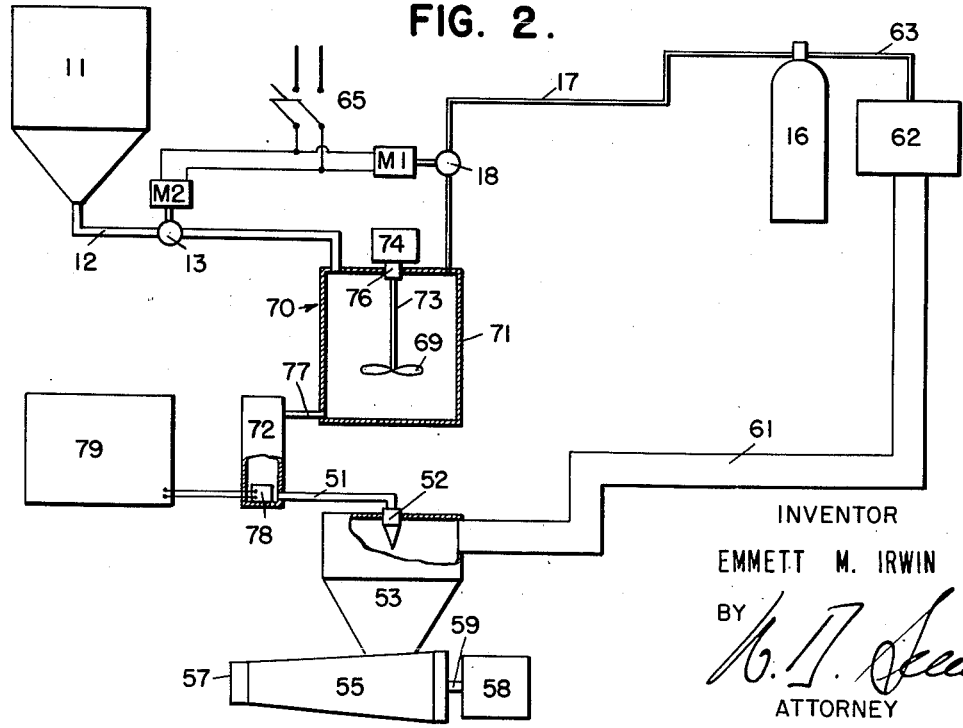

The second preferred embodiment of the invention, illustrated in Figure 2, comprises a construction fundamentally similar to that described above. Except as specifically recited the construction can be understood to be basically like the first embodiment. Liquid ice cream mix is fed from the tank of container 11 through a pipe 12 in series with a constant displacement pump 13 to the mixing unit, here indicated generally by the reference character 70. In the present embodiment the mixing unit comprises a mixing tank 71 and a spaced emulsifier 72. Conduit 12 from the liquid mix reservoir 11 connects directly to the mixing tank 71 as does the incoming pipe 17 from the refrigerant source 16. A constant displacement pump 18 is in series with the refrigerant pipe 17 and two driving motors M1 and M2 actuate these pumps at a constant speed under the control of a manually operable switch 65. Here, as in the first embodiment, if desired a single driving motor can be used to actuate the pumps rather than a pair of motors. Within the mixing chamber 71 is a rotary mechanical agitator or stirrer 69 carried by a shaft 73 connected to a driving motor 74 positioned thereabove, a suitable seal 76 enclosing the shaft at the point at which it extends through the tank wall.

The lower end of the tank 71 is connected by an outlet conduit 77 to the emulsifier 72 comprising a chamber within which is positioned a supersonic vibrator unit 78. The latter is suitably connected to a supersonic energy generator 79 which may be of any well known type adapted to generate vibrations in the supersonic range in a vibrator which may be a crystal. The vibrator itself may be positioned directly in the emulsifier tank or instead may be positioned in a body of oil and sealed from the tank's interior by a movable diaphragm through which the vibrations are transmitted.

From the emulsifier 72 the single liquid, for the liquid ice cream mix and the liquid refrigerant under the action of the high frequency vibrations have become a single liquid in the sense of being an emulsion, passes through the outlet conduit 51 to the spray nozzle 52, as in the first described embodiment, and is sprayed into the separating vessel 53 to become a powder finally to be extruded by the extruder 55 positioned therebelow as previously described but in the present instance with its shaft 59 connected to its own driving motor 58.

In this second embodiment, as in the first, the refrigerant gas evaporated in separating vessel 53 is conveyed to the recovery unit 62 through the conduit 61, is liquified, and is then reconveyed to the reservoir 16 by the conduit 63.

The operation of this second embodiment of the invention is believed to be clear. The liquid mix is first thoroughly mixed mechanically within the agitating chamber or tank 71 by the action of the rotating mechanical agitator 69 and subsequently flows through the conduit 77 into the emulsifier 72 where the two liquids in fact become one, a part of the refrigerant being adsorbed in the liquid ice cream. Freezing takes place in the separating chamber 53 as in the first embodiment and the liberated refrigerant gas is returned to the recovery equipment. The extruder performs its function of compressing the product to the desired extent to give a controlled density and over-run which can be varied by varying the speed of the motor 58.

While the particular processes and apparatuses herein disclosed and described in detail are fully capable of attaining the objects and providing the advantages hereinbefore stated, it is to be understood that they are merely illustrative of the presently preferred embodiments and that no limitations are intended as to the details other than as defined in the appended claims.

I claim:

1. An apparatus for continuously transforming a liquid into finely divided solid particles comprising a source of supply of said liquid, a source of supply of liquid refrigerant, a mixing chamber, pumping means adapted to pump each of said liquids into said mixing chamber under pressure, means disposed in said mixing chamber adapted to emulsify said liquid and said liquid refrigerant, and means for discharging said emulsified liquids from said mixing chamber into atmospheric pressure to thereby permit expansion of said liquid refrigerant, which said liquid refrigerant upon expanding causes solidification of said liquid.

2. An apparatus for continuously transforming a liquid ice cream mix into a solid comprising a source of supply of said liquid ice cream mix, a source of supply of non-toxic liquid refrigerant, which is capable of being adsorbed by said liquid ice cream mix while under pressure, a mixing chamber, pumping means adapted to pump each of said liquids into said mixing chamber, means disposed in said mixing chamber adapted to emulsify said liquid ice cream mix and said liquid refrigerant, means for discharging said emulsified liquids from said mixing chamber into atmospheric pressure to thereby permit expansion of said liquid refrigerant, which said liquid refrigerant upon expanding causes solidification of said liquid ice cream mix, and means for collecting and compressing said solidified ice cream mix, comprising a vessel into which said solidified ice cream mix is discharged from said mixing chamber, said vessel having an opening disposed at the bottom thereof, a conical screw conveyor disposed subadjacent said opening and adapted to receive said solidified ice cream mix and to extrude and compress said solidified ice cream mix upon rotation thereof, and means for rotating said conveyor at a speed proportional to the pumping rate of said pumping means.

3. An apparatus for making ice cream comprising a mixing chamber adapted to receive liquid ice cream mix and a non-toxic liquid refrigerant, first pumping means to pump said ice cream mix into said mixing chamber, second pumping means to pump said liquid refrigerant from a source of said refrigerant into said mixing chamber at a pressure higher than that of said source, means to emulsify said ice cream mix and said liquid refrigerant and a discharge nozzle for discharging said emulsified liquid into a chamber of pressure lower than that of said mixing chamber to thereby permit the expansion of said liquid refrigerant to freeze said ice cream mix, and means to maintain the pressure in said mixing chamber at a pre-determined level above the pressure of said refrigerant at its source, said last-named means comprising an electric motor driving both of said pumping means, a motor speed controller controlling the speed of said motor and thereby the input of both of said pumps into said mixing chamber, and a differential pressure regulator responsive to the pressure in said mixing chamber and the pressure of said liquid refrigerant at its source adapted to control said speed controller and operative upon variations of pressure differentials existing between said mixing chamber and said source of liquid refrigerant to actuate said speed controller to effect a change in the speed of said motor.

4. An apparatus for the continuous production of ice cream, a mixing chamber adapted to receive liquid ice cream mix and a refrigerant which is liquid capable of being partially adsorbed by said ice cream mix while under pressure, means to pump said liquid ice cream mix into said mixing chamber under pressure, and a second pumping means to pump refrigerant under pressure into said chamber, means to emulsify said liquid ice cream mix and said liquified refrigerant in said chamber, and means for discharging said emulsified liquid into a chamber of pressure lower than that of said mixing chamber to thereby permit the expansion of said liquid refrigerant to thereby freeze said liquid to be solidified, means to maintain the pressure in said mixing chamber at a pre-determined level above the pressure of said liquid refrigerant at its source, said last-named means comprising an electric motor driving both of said pumping means, a motor speed controller controlling the speed of said motor and thereby the input of both of said pumps into said mixing chamber, and a differential pressure regulator responsive to the pressure in said mixing chamber and the pressure of said liquid refrigerant at its source adapted to control said speed controller and operative upon variations of pressure differentials existing between said mixing chamber and said source of liquid refrigerant to actuate said speed controller to effect a change in the speed of said motor, and means for collecting and compressing said solidified ice cream mix, comprising a vessel into which said solidified ice cream mix is discharged from said mixing chamber said vessel having an opening disposed at the bottom thereof, a conical screw conveyor disposed subadjacent said opening and adapted to receive said solidified ice cream mix and to extrude and compress said solidified ice cream mix upon rotation thereof, and means for rotating said conveyor at a speed proportional to the pumping rate of said pumping means.

5. The method of solidifying liquid comprising the step of introducing liquid into a mixing chamber under a relatively high pressure, introducing a liquid refrigerant into said mixing chamber under a relatively high pressure, emulsifying said liquids, and discharging said liquids into a chamber at relatively lower pressure to thereby permit expansion of said liquid refrigerant to absorb heat from said liquid thereby solidifying said liquid.

EMMETT M. IRWIN.

REFERENCES CITED

The following references are of record in the file of this patent:

UNITED STATES PATENTS

| Number | Name | Date |
|---|---|---|
| 1,976,204 | Voorhees | Oct. 9, 1934 |
| 2,020,719 | Bottoms | Nov. 12, 1935 |
| 2,062,374 | Noel | Dec. 1, 1936 |